Figure 3:
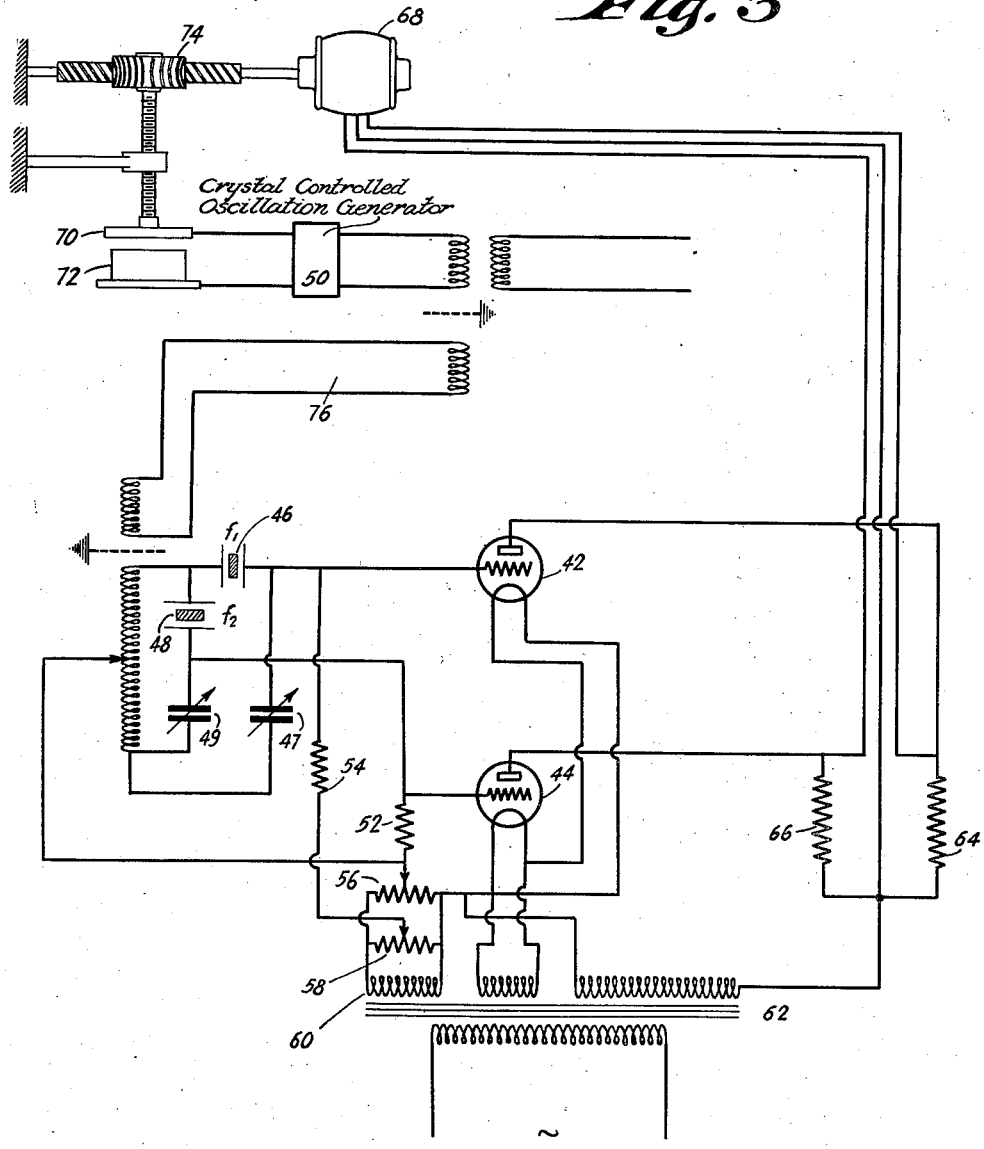

July 2, 1935.                H. O. PETERSON                 2,007,145
                    FREQUENCY DETERMINATION AND ADJUSTMENT
                          Filed June 5, 1931              2 Sheets-Sheet 1
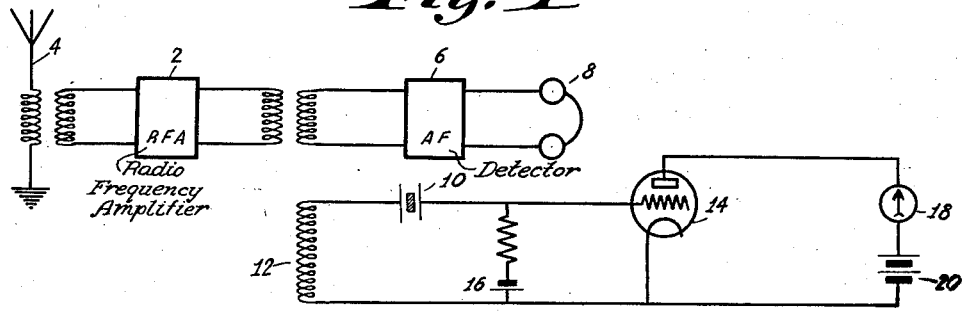
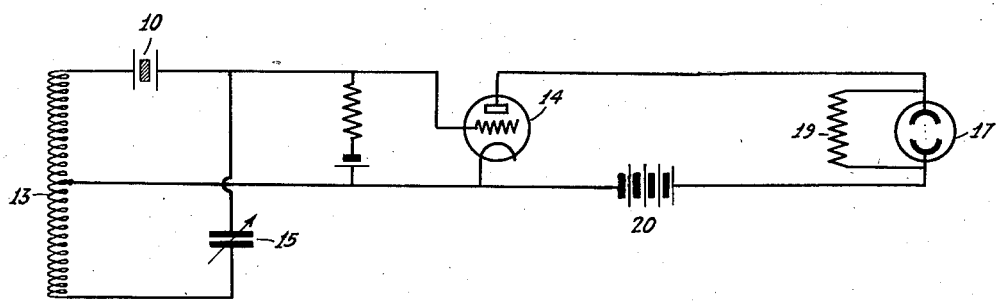
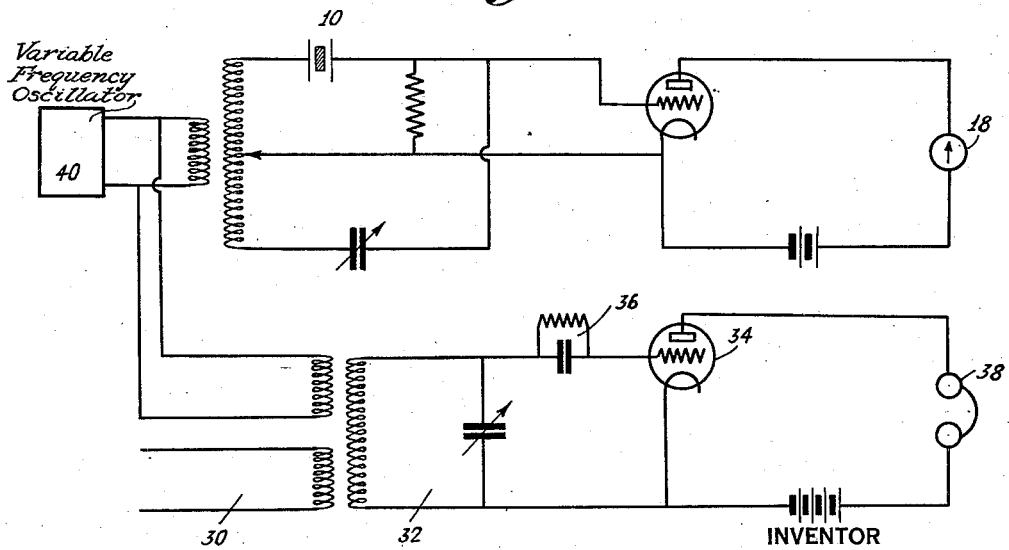
INVENTOR
HAROLD O. PETERSON
BY
ATTORNEY Patented July 2, 1935

2,007,145

UNITED STATES PATENT OFFICE 2,007,145

FREQUENCY DETERMINATION AND ADJUSTMENT

Harold Olaf Peterson, Riverhead, Long Island, N. Y., assignor to Radio Corporation of America, a corporation of Delaware Application June 5, 1931, Serial No. 542,208

2 Claims. (Cl. 250—39)

This invention relates to the accurate determination and/or adjustment of the frequency of high frequency alternating currents.

It is an object of my invention to provide a wave-meter comprising a sharply tuned series circuit, preferably in the form of a crystal, for the reason that the crystal may be accurately ground to respond to a predetermined frequency, in combination with an electron discharge device biased to cut-off or rendered non-conductive by the application of suitable potentials. By placing the crystal in series with a coupling impedance across the input electrodes of the device, at resonance, the crystal will act as a series tuned circuit drawing an appreciable current, thereby causing current to flow through the electron discharge device in whose output circuit there may be connected an indicating device in the form of, say, a milliammeter or glow tube which will give an accurate indication of the presence of energy of a frequency corresponding to that of the crystal.

Another object of my present invention is to provide a wavemeter arrangement which will indicate the direction of drift in frequency of an oscillating source.

Still another object of my present invention is to provide for the automatic adjustment in frequency of an oscillating source to correspond with a desired predetermined frequency or a band of frequencies.

My present invention is defined as required by law in the appended claims. However, it may best be understood both as to its structural organization and mode of operation by referring to the accompanying drawings, wherein, Figure 1 is a wiring diagram of an improved wavemeter according to my present invention coupled to a receiver for indicating whether or not a transmission station is operating on a correct wave length, Figure 2 illustrates a modification of my improved wavemeter, Figure 3 illustrates an arrangement for automatically maintaining the frequency of an oscillating source within desired limits, and, Figure 4 illustrates a wavemeter arrangement wherein the direction of drift of, for example, a transmitter, may be determined.

My improved wavemeter and associated circuits are especially applicable for indicating whether or not a transmitter or oscillating source is operating on its assigned frequency, and, in Figure 1 to establish the correct operation of a transmitter I have shown my improved wavemeter coupled to the output of a radio frequency amplifier 2 supplied with energy from a suitable receiving antenna 4, the output of the radio frequency amplifier being detected by a suitable detector 6, and the detected output being fed to any suitable utilization device such as telephones 8.

To show whether or not the transmitter, not shown, is operating on its assigned wave length, crystal 10 of my improved wavemeter, is ground to the frequency upon which the transmitter should be operated. In series with the crystal 10, which, of course, may be replaced by a series tuned circuit, although the crystal 10 is preferred because of its sharper and more constant characteristic, there is connected a coupling impedance in the form of an inductance coil 12, and the series combination of crystal and coil is connected in series with or across the grid and filament of electron discharge device 14 biased to cut-off or rendered non-conductive by a suitable source of potential 16 between the grid and filament of tube 14. In the output circuit or in series with the output electrodes of electron discharge device 14, there is connected an indicating device here shown as a milliammeter 18 in series with the source of anode or plate potential 20.

Now, if the transmitter is operating at the correct frequency corresponding to that for which crystal 10 is ground, crystal 10 will act as a series tuned circuit causing a large flow of current through coil 10. This in turn will cause high radio frequency potentials to be present across coil 12 as a result of which, on alternate half cycles, tube 14 will draw current giving an indication in the milliammeter that the transmitter is operating at its correct frequency. Should the transmitter vary even slightly from its assigned frequency there will be no indication in the milliammeter 18 by virtue of the fact that at frequencies different from the natural frequency of crystal 10, or any harmonic thereof, the crystal 10 will not build up voltages in coil 12 sufficient to overcome the biasing potential imparted to the grid by source 16.

To sharpen the resonance characteristic of the crystal and its associated electrodes, the crystal 10, as shown in Figure 2, may have its interelectrode capacity neutralized by using a suitable split impedance or coil 13 connected at one end directly to one electrode of crystal 10 and at its other end through a variable neutralizing condenser 15 to the other electrode of the crystal.

Connections to the input electrodes or grid and cathode of electron discharge device 14 are made to a point intermediate the ends of coil 13 preferably at a point of zero alternating potential; and, directly to one electrode of crystal 10.

In the output circuit of tube 14 there is placed a glow discharge device or tube 17 in series with the source of plate potential 20. At the resonance frequency of crystal 10 or at a harmonic frequency thereof, alternate half cycles of positive potentials applied to the grid of tube 14, will render the tube conductive, as a result of which current flow through resistance 19 shunting glow tube 17 will impress a break-down potential across glow tube 17 thereby causing an indication when, as indicated, the energy applied to coil 13 is of the correct frequency.

Resistance 19 is not absolutely essential for the reason that action would occur without it since at the times when the grid of tube 14 is rendered positive, the resistance of tube 14 is materially decreased, thereby allowing the application of break-down voltage directly from source 20 to the glow tube 17.

As illustrated in Figure 4, my improved crystal wavemeter circuit may be used as a calibrating device for indicating the frequency of an oscillating source, for example, a high frequency transmitter. As shown in Figure 4, energy from a high frequency source, not shown, is fed through a coupling coil 30 to the tunable input circuit 32 of detector 34 whose grid is biased by the action of grid leak and condenser arrangement 36. In the output circuit of detector 34 there is an indicating device here shown as ear phones 38. A variable frequency oscillator 40 is adjusted so that its fundamental or a harmonic thereof corresponds in frequency to that of the known frequency of crystal 10 at which time there will be an indication registered by meter 18.

If the oscillating source is oscillating at its correct frequency or the frequency of crystal 10, then there will also be at that time zero beat in the ear phones 38. But, if the oscillating source coupled to coil 30 has drifted in frequency, a sound will be heard in phones 38 and, the amount of this drift may be determined by adjusting the variable frequency oscillator 40 until zero beat is obtained in ear phones 38. The amount of the drift and the direction thereof whether above or below the frequency of crystal 10 may readily be determined by noting the settings on the means used to vary the frequency of the variable frequency oscillator 40.

Or, by replacing ear phones 38 with a frequency meter the amount of frequency drift may be determined, and, the setting of the variable frequency oscillator 40 will indicate the direction of the frequency drift.

My improved wavemeter circuit with modifications may be used for automatically maintaining the frequency of an oscillating source, for example, a crystal controlled oscillator within desired frequency limits. Thus, as shown in Figure 3, to the grid circuits of electron discharge devices 42, 44, preferably of the gas-filled, or so-called "Thyratron" type, there are coupled respectively the crystal 46 having the frequency $f_1$ and crystal 48 having the frequency $f_2$ between which it is desired that the crystal controlled source 50 operate. Preferably, the crystals are chosen so as to have overlapping resonance curves.

Neutralizing condensers 47, 49 are provided to neutralize the interelectrode capacities of the crystals 46, 48 respectively. Normal grid bias is obtained by the action of resistors 52, 54 tapped across resistors 56, 58 in turn connected across the secondary 60 of the alternating current supply transformer 62. The transformer also supplies cathode heating energy and anode current for the electron discharge devices 42, 44.

Now, with a shift in frequency towards the resonance frequency of either of the crystals 46, 48, there will be a corresponding increase in current in the anode resistors or impedances 64, 66, connected respectively to the output electrodes of tubes 42, 44. As a result, a reversible motor 68 will be operated varying the spacing of the electrode 70 of the frequency controlling crystal 72 by virtue of the worm and gear mechanism 74 coupled to the reversible motor 68. Consequently, the output of the oscillating apparatus or source 50, controlled by crystal 72, will be varied so that the energy fed back through the inductive coupling link 76 lies between the frequency $f_1$ and $f_2$ of crystals 46, 48.

In other words, for example, a shift in frequency towards frequency $f_2$ of crystal 48 will cause a predetermined current flow through resistor 66 as a result of which the motor will operate varying the spacing of the electrode 70 in the proper direction to bring the frequency of the crystal oscillating apparatus 50 back in frequency towards the direction of frequency $f_1$.

Obviously other frequency adjusting means may be used. For example, rather than vary the spacing of a crystal, variation of capacity may be used to effect a change in frequency of an oscillating source as desired, or, ordinary manual frequency adjusting means may be used, in which case resistors 66, 64 would be replaced or used to supply voltage to indicating devices whereupon manual adjustment of the oscillator would be relied upon to produce oscillations of the correct frequency. The correct frequency would be indicated by like readings or indications on the indicators coupled to impedances 64, 66.

Having thus described my invention, what I claim is:

1. A wave meter comprising an electron discharge device having an anode, a cathode, and a grid; means for impressing a negative potential upon said grid whereby said device is biased to cutoff; means, connected to said grid and cathode, whereby potentials having a predetermined frequency cause the application to said grid of positive peaks of potential sufficient to overcome said cutoff bias whereby current flows through said electron discharge tube, said means comprising a coupling coil and a piezo-electric crystal tuned to said predetermined frequency; and, an indicating device coupled to the output electrodes of said electron discharge device for indicating said current flow.

2. A wave meter comprising an electron discharge device having input and output electrodes; means to bias said electron discharge device to cutoff, means, connected to said input electrodes, whereby potentials having a predetermined frequency cause the application to said input electrodes of potentials of peak values sufficient to overcome said cutoff bias whereby current flows through said electron discharge tube, said means comprising a coupling coil and a piezo-electric crystal tuned to said predetermined frequency; means for neutralizing the inter-electrode capacity of said piezo-electric crystal; and, a glow discharge device connected to the output electrodes of said electron discharge device, said glow discharge device being responsive to current flow through said electron discharge device whereby said glow discharge device glows upon current flow through said electron discharge device.

HAROLD OLAF PETERSON.